US010184213B2

(12) United States Patent
Zeeuw et al.

(10) Patent No.: US 10,184,213 B2
(45) Date of Patent: Jan. 22, 2019

(54) PROCESS FOR TREATING BLACK LIQUOR

(71) Applicant: Huntsman International LLC, The Woodlands, TX (US)

(72) Inventors: Arend-Jan Zeeuw, Wassenaar (NL); James Theodore Wearing, Vancouver (CA); David Anthony Boyd, Vancouver (CA); Clive Brereton, Richmond (CA); Brian Blackwell, Vancouver (CA)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 15/509,137

(22) PCT Filed: Sep. 22, 2015

(86) PCT No.: PCT/EP2015/071652
§ 371 (c)(1),
(2) Date: Mar. 6, 2017

(87) PCT Pub. No.: WO2016/046161
PCT Pub. Date: Mar. 31, 2016

(65) Prior Publication Data
US 2017/0306558 A1    Oct. 26, 2017

(30) Foreign Application Priority Data

Sep. 22, 2014 (EP) .................. 14185752.4

(51) Int. Cl.
*D21C 11/00* (2006.01)
*D21C 11/06* (2006.01)
*D21C 11/10* (2006.01)
*D21C 11/12* (2006.01)

(52) U.S. Cl.
CPC ...... *D21C 11/0092* (2013.01); *D21C 11/0007* (2013.01); *D21C 11/12* (2013.01); *D21C 11/125* (2013.01); *Y02P 70/24* (2015.11)

(58) Field of Classification Search
CPC ... D21C 11/125; D21C 11/12; D21C 11/0007; D21C 11/0092; D21C 11/06; D21C 11/066; Y02P 30/20; Y02P 20/129; Y02P 20/52; Y02P 70/24; C10B 53/02; C10B 49/22; C10B 47/24; Y02E 50/14; Y10S 423/03; Y10S 159/03
See application file for complete search history.

(56) References Cited

U.S. PATENT DOCUMENTS

| 3,676,064 | A | * | 7/1972 | Shick | ............ D21C 11/125 155/3 |
| 3,711,593 | A | * | 1/1973 | Shick | ............ C01B 17/60 159/47.3 |
| 4,135,968 | A | * | 1/1979 | Dehaas | ............ D21C 11/12 162/30.1 |
| 4,303,469 | A | * | 12/1981 | DiNovo | ............ D21C 11/0092 1/92 |
| 4,311,670 | A | * | 1/1982 | Nieminen | ............ B01J 8/32 34/363 |
| 4,409,416 | A | * | 10/1983 | Snell | ............ C07C 1/00 201/34 |
| 4,526,760 | A | * | 7/1985 | Empie, Jr. | ............ D21C 11/066 110/210 |
| 4,668,342 | A | * | 5/1987 | Blackwell | ............ D21C 11/0064 162/30.11 |
| 5,634,950 | A | * | 6/1997 | McIlroy | ............ C10J 3/54 48/111 |
| 5,707,490 | A | * | 1/1998 | Kuusio | ............ D21C 11/06 110/238 |
| 5,738,758 | A | * | 4/1998 | van Heiningen | ............ B01D 53/48 162/30.11 |
| 6,123,806 | A | * | 9/2000 | Roberts | ............ D21C 11/0064 162/14 |
| 8,246,779 | B2 | * | 8/2012 | Foan | ............ D21C 3/02 162/29 |
| 8,500,954 | B2 | * | 8/2013 | Lehto | ............ D21C 11/125 162/29 |
| 8,821,686 | B2 | * | 9/2014 | Lehto | ............ D21C 11/04 162/29 |
| 2005/0036940 | A1 | * | 2/2005 | Grace | ............ B01J 8/0055 423/652 |
| 2006/0201641 | A1 | * | 9/2006 | Harris | ............ D21C 11/125 162/37 |
| 2011/0067829 | A1 | * | 3/2011 | Foan | ............ D21C 3/02 162/29 |
| 2011/0120662 | A1 | * | 5/2011 | Lehto | ............ D21C 11/04 162/29 |
| 2011/0247771 | A1 | | 10/2011 | Lehto et al. | |
| 2012/0029243 | A1 | * | 2/2012 | Pantouflas | ............ C10G 3/44 568/630 |
| 2012/0228118 | A1 | | 9/2012 | Honkola | |
| 2013/0118886 | A1 | | 5/2013 | Bridgwater et al. | |
| 2014/0100396 | A1 | * | 4/2014 | DeSisto | ................ C10K 1/024 585/242 |

(Continued)

FOREIGN PATENT DOCUMENTS

EP    2309056 A1    4/2011
WO    9508022 A1    3/1995

(Continued)

*Primary Examiner* — Jose A Fortuna

(74) *Attorney, Agent, or Firm* — Huntsman International LLC; Robert Diaz

(57) ABSTRACT

The invention discloses a process for treating black liquor comprising pyrolyzing black liquor in a fluidized bed reactor to obtain solid particles and pyrolyzed black liquor gas, heating the solid mass, returning the heated solid mass to the fluidized bed reactor for use in the pyrolysis reaction; condensing the pyrolyzed black liquor gas to obtain a condensate and recover heat and a residual gas released during condensation for heating the solid mass to a predetermined temperature for that is required for the pyrolysis.

18 Claims, 1 Drawing Sheet

(56) References Cited

U.S. PATENT DOCUMENTS

| | | | | |
|---|---|---|---|---|
| 2016/0002162 A1* | 1/2016 | Tanzio | .................. | C07D 209/08 |
| | | | | 548/469 |
| 2016/0137924 A1* | 5/2016 | Mazanec | .................. | C05D 9/00 |
| | | | | 47/58.1 SC |
| 2016/0326438 A1* | 11/2016 | Sorensen | ................. | C10B 53/02 |
| 2017/0306558 A1* | 10/2017 | Zeeuw | ............... | D21C 11/0092 |
| 2018/0245000 A1* | 8/2018 | Urade | .................... | C10K 1/002 |

FOREIGN PATENT DOCUMENTS

| | | | | |
|---|---|---|---|---|
| WO | 2011055010 A1 | 5/2011 | | |
| WO | 2012022949 A1 | 2/2012 | | |
| WO | WO-2016046161 A1 * | 3/2016 | ............. | D21C 11/12 |

* cited by examiner

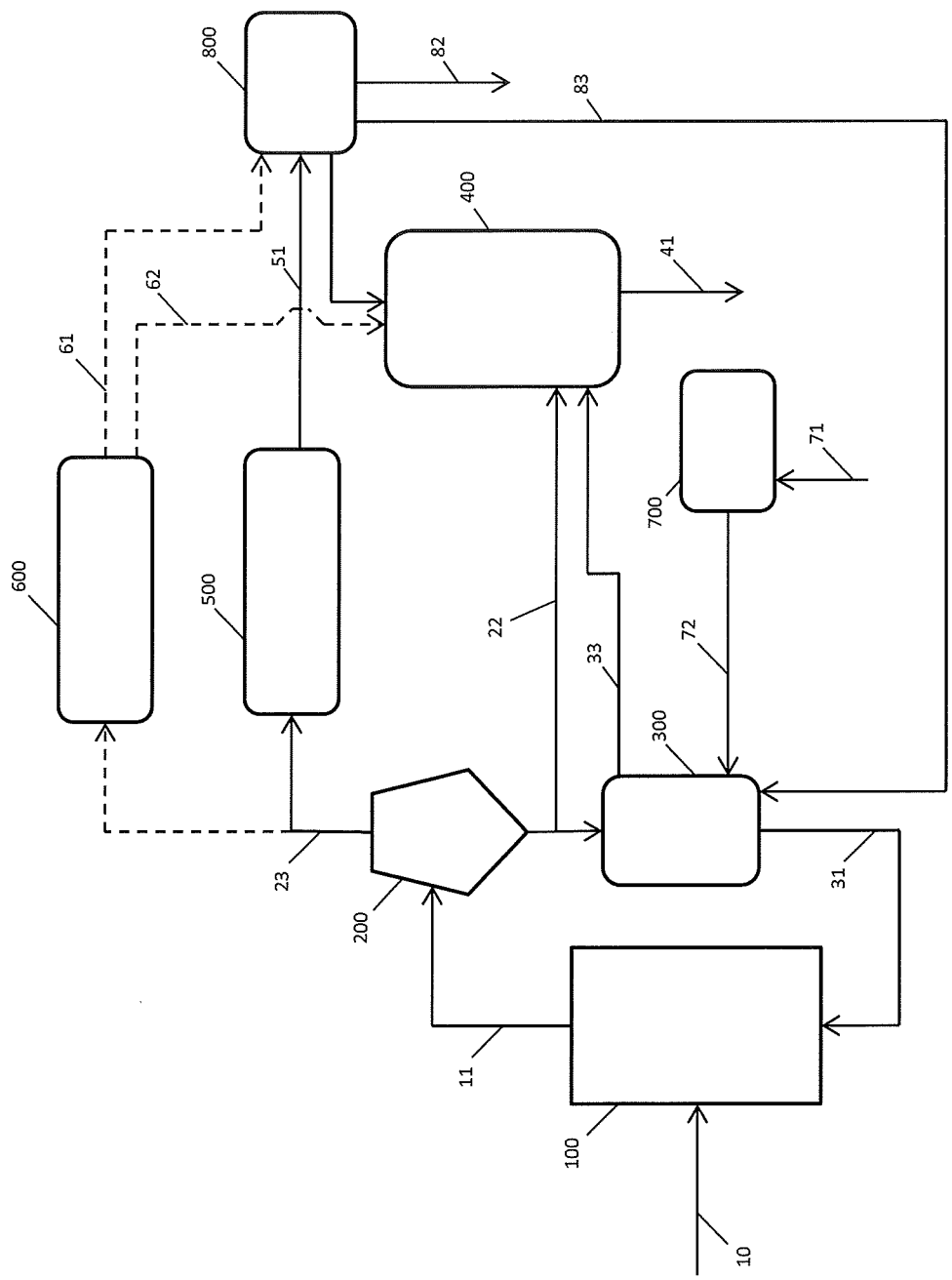

PROCESS FOR TREATING BLACK LIQUOR

CROSS-REFERENCE TO RELATED APPLICATIONS

This application is the National Phase of International Application PCT/EP2015/071652 filed Sep. 22, 2015 which designated the U.S. and which claims priority to European App. Serial No. 14185752.4 filed Sep. 22, 2014. The noted applications are incorporated herein by reference.

The invention relates to a process for treating black liquor. In particular, the invention relates to a process to obtain pyrolysed black liquor gas that can be treated further.

BACKGROUND OF THE INVENTION

In a paper pulping process, wood chips are treated in a digester system to separate the cellulose fibers and to remove lignin, which binds the fibers together in the natural state of wood. Digestion of wood chips using heat and chemicals is a common practice in the industry. In the so called "kraft process", wood chips and an alkaline digesting liquor are introduced to a digester creating pulp and black liquor, which is a lignin containing soluble part. After the digestion process the produced pulp and the black liquor are separated. The pulp comprises cellulose fibers and is typically treated further to make paper. The black liquor comprises lignin, hemicelluloses, inorganic salts, and other extractive components. The black liquor can be withdrawn from the digester and can be treated further by burning it in specific recovery boilers for energy production and recovering of the salt, which can be used again in the kraft process. Some part of the black liquor can be used to recover lignin. Lignin can subsequently be depolymerized to the corresponding alkylphenol (ethers), which can react further and be used for several applications.

There are several other ways of processing black liquor known in the art. Black liquor contains energetically valuable big aromatic structures, such as lignin, and processing the black liquor is performed to obtain energy. Depending on the processing method of the black liquor, besides energy, different compositions of compounds or different concentrations of the compositions are further obtained. Black liquor gasification, using air or oxygen as the gasification medium is used to obtaining compounds such as syngas. The syngas can be further processed to obtain bio-fuel for automotive and other industrial uses or can be catalytically converted to MeOH, dimethyl ether, or other higher molecular weight and more valuable organic molecules.

Though treated black liquor has found applications in various markets, there is still a need for providing other ways of processing black liquor. A lot of research has been conducted by treating the black liquor to recover the salt by other ways than by using the recovery boiler. A disadvantage is that parts of the existing pulp mills installation become redundant.

SUMMARY OF THE INVENTION

It is therefore an object to obtain a process for treating black liquor which can be implemented in an existing kraft paper mill, and whereby sufficient black liquor remains available for recovering salt for the pulping process of the wood chips.

In addition it is an object of the invention to provide a new process for treating black liquor so that the treated black liquor provides substances that can be used further in several industrial applications.

In addition it is an object of the invention to provide a new and continuous process for treating black liquor so that the residues and energy streams released during the treatment are optimally used in other processes and in the existing paper mill process.

These objects, amongst other objects, can be reached, at least partially, if not completely, by a process according to the present invention.

In particular, these objects can be reached, at least partially, by the first aspect according to the invention, a process for treating black liquor comprising the steps of:
  providing a fluidized bed reactor comprising a solid mass that comprises solid particles, wherein the solid mass has a temperature and heat capacity such that black liquor pyrolyses and such that the solid particles remain fluidizable;
  providing black liquor and letting the black liquor flow into the fluidized bed reactor to provide a pyrolysis reaction of the black liquor and to obtain solid particles and pyrolysed black liquor gas, wherein the solid particles form part of the solid mass;
  separating the solid mass from the pyrolysed black liquor gas;
  heating at least a first part of the solid mass;
  returning the heated solid mass to the fluidized bed reactor for use in the pyrolysis reaction;
  treating the pyrolysed black liquor gas in a second reactor to obtain treated pyrolysed black liquor gas;
  optionally absorbing the treated pyrolysed black liquor gas;
  condensing the treated pyrolysed black liquor gas, which was optionally absorbed, to obtain a condensate, heat released during condensation and residual gas;
  recover the heat and/or the residual gas released during the condensation or absorption.

FIGURES

The invention is illustrated but not limited by the following FIGURE.

FIG. 1 is a schematic view of a process for pyrolysing black liquor according to the invention, wherein the obtained pyrolysed black liquor gas is treated further via a catalyst.

DEFINITIONS AND TERMS

Black liquor: According to this invention black liquor is the soluble part that is present after wood chips have been treated with the kraft process. In the kraft process a basic mixture such as a mixture of sodium hydroxide and sodium sulfide, or a mixture of sodium hydroxide and anthraquinone (Soda-AQ), is added to wood chips and digested in a digester so that the bonds that link lignin to the cellulose break, which results in cellulose pulp, which is insoluble in the basic environment, and a liquid, the black liquor. Black liquor comprises lignin, lignin fragments, hemicellulose, carbohydrates from the breakdown of hemicellulose, sodium carbonate, sodium sulfate and other inorganic salts and water. Typically, black liquor has a 15 wt % solids content by weight. The solid mass of black liquor can be measured according to the Test Method TAPPI T650 OM-09.

Catalyst: According to this invention a catalyst is a material that modifies and increases the rate of a reaction without being consumed in the process.

Pyrolysis in this context means a thermo-chemical process, wherein the feed is subject to high temperature, whereas no air or $O_2$ or steam is added and wherein the heat is introduced into the process via the solid substrate and through the heat the black liquor decomposes into pyrolysed black liquor gas and solid particles.

Absorption is a process wherein a gas stream is brought into contact with a liquid, with the aim of allowing certain gaseous components to pass from the gas to the liquid while other gaseous components don't remain in the liquid and exit the absorber where the absorption occurs.

DESCRIPTION

The present invention will now be further described. In the following passages, different embodiments of the invention are defined in more detail. Each aspect so defined may be combined with any other embodiment unless clearly indicated to the contrary. In particular, any feature indicated as being preferred or advantageous may be combined with any other feature or features indicated as being preferred or advantageous.

Before the present method used in the invention is described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

According to one embodiment, the invention is related to a process for treating black liquor comprising the steps of:
  providing a gas-solid fluidized bed reactor comprising solids fluidized by gas (solids mass) that comprises solid particles, wherein the solids mass has a temperature and heat capacity such that black liquor pyrolyses and such that the solid particles remain in a state where they are sufficiently solid so that there is not substantial agglomeration into large particulates which do not fluidize;
  providing black liquor and letting the black liquor flow into the fluidized bed reactor to provide a pyrolysis reaction of the black liquor and to obtain solid particles and pyrolysed black liquor gas, wherein the solid particles form part of the solid mass;
  separating the solid mass from the pyrolysed black liquor gas;
  heating at least a first part of the solid mass;
  returning the heated solid mass to the fluidized bed reactor for use in the pyrolysis reaction;
  treating the pyrolysed black liquor gas in a second reactor to obtain treated pyrolysed black liquor gas;
  optionally absorbing the treated pyrolysed black liquor gas;
  condensing the treated pyrolysed black liquor gas, which was optionally absorbed, to obtain a condensate, heat released during condensation and residual gas;
  recover the heat and/or the residual gas released during condensation or absorption.

The inventors surprisingly found that by subjecting black liquor, which is a liquid, to pyrolysis without the addition of a catalyst, black liquor gas and solid particles are formed, wherein the black liquor gas still comprises sufficient amount of compounds with a great energetic value. The pyrolysed black liquor gas comprises compounds such as hydrogen, carbon monoxide, carbon dioxide, methane syngas, water, hydrocarbons with olefinic unsaturation, oxygen containing compounds and monomeric and oligomeric aromatic compounds. The black liquor gas can be treated further, e.g. via catalytic treatment, so that desirable compounds, such as monomeric aromatics can be obtained. Further, since no catalyst is used during pyrolysis, the regeneration of the catalyst is not required and no equipment for regeneration is required.

In addition, the inventors found a continuous process for treating black liquor wherein the energy, chemicals and other material that are released are optimally recovered in the process, taking into account that the process can be used in an existing pulp mill, so that a minimal amount of extra energy is required for running the process, while valuable chemical compounds can be created. The solid particles that are formed during the pyrolysis of the black liquor, form part of the solid mass. Although the solid mass may contain other inert solids, it is preferred that the solid mass comprises only material that is derived from the black liquor pyrolysis so that only streams from the paper mill or the process of the invention is required. The solid mass mainly contains char and salts derived from the black liquor. After separation of the solid mass and the pyrolysed black liquor gas, the solid mass may need reheating in order to increase its sensible heat and provide the heat required for the endothermic pyrolysis reaction. The inventors found that the heat and other residues of which energy can be recovered being released in other places of the process can be used to bring the solid mass to the required temperature. Indeed, the heat and other residue released during the condensation or absorption of the pyrolysed black liquor gas, or the treated pyrolysed black liquor gas, can be at least partially used to bring the solid mass to the required temperature. The solid mass is brought to a predetermined temperature which is the temperature that is required to enable the pyrolysis of the black liquor. It is not required that the solid mass is further converted, the only function of the heating is bringing the solid mass to the predetermined temperature so that the temperature is sufficiently high such that black liquor pyrolyses and such that the solid particles remain solid. The solid particles do not start to melt and preferably do not substantially agglomerate into large particulates which do not fluidize. The solid mass is returned to the fluidized bed reactor, so that there remains sufficient solid mass in the reactor to perform the pyrolysis.

After pyrolysis of the black liquor, the treated pyrolysed black liquor gas, can optionally be absorbed. The absorption occurs using an absorption material which can be e.g. a mixture comprising aliphatic, cycloaliphatic or aromatic hydrocarbons. The absorbing material has a high affinity for the valuable compounds in the treated pyrolysed black liquor gas. Compounds having less or no affinity with the absorbing material, such as fluidizing gas, carbon monoxide, carbon dioxide, water, nitrogen will not remain in the absorbing material.

Further, a part of the heat and residue gas released during condensation can be used for heating a recovery boiler or for heating other parts in the paper mill plant or even surrounding plants. A recovery boiler is an installation which is found in most of the pulp mill industries and recovers salts from black liquor to reuse again for making paper pulp. Typically, the recovery of salts occurs at a temperature of more than 950° C., at which the salts start to melt, which salts can be separated from the black liquor in the recovery boiler.

In one embodiment, the heating of the solid mass, which can be done in a solids heater, e.g. via direct combustion or gasification in a separate chamber, or via indirect heating or a combination thereof, results in the release of solids heater residues in the form of gases. These residues can be recovered and used as energy source for heating the recovery boiler or for other parts in the paper mill plant or even other surrounding plants.

In one embodiment, another part of the solid mass that is separated from the pyrolysed black liquor gas can stream to the recovery boiler. The salt in the solid mass can there be recovered and reused to make paper pulp, whereby the salt starts melting and can be separated from the char. Preferably between 5% and 50% of the separated solid mass goes to the recovery boiler. This embodiment has as great advantage that char, which can be considered as waste material during pyrolysis, is used for other valuable processes in the paper mill industry. Indeed, the char formed during pyrolysis can be used further to recover the salt in the solid mass. In the recovery boiler, the char can be used as fuel and provides energy for melting the salts.

Preferably, the temperature of the solid mass is sufficiently high so that the black liquor pyrolyses and the solid substrate remains solid. Preferably, the temperature is below the temperature where sodium sulfate or sulfide starts to decompose, whereby sulfur-containing gases, such as hydrogen sulfide, are released, which may poison the catalyst for treating the pyrolysed black liquor gas. The temperature of the pyrolysis preferably occurs above 400° C., preferably above 500° C. Preferably, the temperature is below the temperature where inorganic compounds, such as salts, start melting. Preferably, the temperature is below 1100° C., more preferably below 900° C. The pyrolysis can be carried out in a reactor having a temperature range between 400° C. and 900° C., preferably in a temperature range of 450° C.-650° C. As described, the solid mass is heated after it has been separated, until a predetermined temperature at which pyrolysis is enabled and reached. Consequently, the separated solid mass is heated to a temperature of between 450° C., preferably above 500° C., 550° C. or above 600° C. Preferably, the preheated solids temperature is below the temperature where inorganic compounds, such as salts, start melting. Preferably, the temperature is below 1100° C., more preferably below 900° C. The determination of the specific predetermined temperature can depend on what will be done with the pyrolysed black liquor gas. If the pyrolysed black liquor gas will be treated further to obtain specific desired compounds, the choice of the temperature will depend on which compounds eventually will be upgraded from the black liquor gas. A skilled person will understand that different temperatures will lead to a different composition of the pyrolysed black liquor gas. Also, the type of further treatment and the type of catalyst that will be used in the further treatment may have an effect on the specific temperature or temperature range that will be used in the pyrolysis.

Preferably, the black liquor is subjected to fast pyrolysis. Preferably, the pyrolysis occurs at a pressure of between 0.5 and 5 bara.

Preferably, fluidizing gas is added to create a sufficiently high velocity in the reactor so that the black liquor feed and the solid substrate form a fluidized bed and the fluidizing and mixing of the black liquor feed and the solid mass in the reactor can take place. The fluidizing gas is preferably an inert gas. Suitable fluidizing gasses are nitrogen, carbon dioxide and other gases with no or little chemical reactivity at the pyrolysing condition. The velocity of the gas is typically 0.5 to 10 m/s at the operating temperature and pressure to keep the gas residence time in the pyrolysis reactor below a predetermined duration, typically between 1 and 10, preferably less than 5 seconds. The pyrolysed black liquor gas flows through the reactor and the solid mass becomes entrained in the pyrolysed black liquor gas flow. The solid particles are then separated from the gas flow and captured.

Preferably, the black liquor entering the fluidized bed reactor has a temperature between 100° C. and 140° C. and more preferably about 120° C. when it enters the fluidized bed reactor. A temperature below 100° C. results in a liquid that is too viscous, and a temperature above 140° C. is preferably avoided, since the compounds in black liquor start polymerizing.

Preferably the black liquor should be fed to the reactor horizontally or vertically using a nozzle under the action of an inert gas over a distributor plate to promote the formation of dispersed liquid droplets with a size in the range of 0.01-3 mm as the pyrolysis reaction is influenced by physical elements such as the black liquor droplet size, the pyrolysis heating rate and swelling of the droplets. The droplets have preferably a diameter so that they pyrolyse prior to depositing on the fluidized bed walls.

Preferably, the black liquor is strong black liquor, which is black liquor provided by the kraft process having a solid content of about 15% that is first evaporated to a solid content greater than 70%, preferably greater than 80% and more preferably greater than 85% before it enters the fluidized bed reactor.

The pyrolysed black liquor gas and the solid mass are separated. Preferably, the separation may be carried out in any known method to separate a gas from a solid mass. Such methods include filtering (filtration), electrostatic separation, separation by gravity, inertia, centrifugal force, thermophoresis (thermal diffusion) and/or a combination of them. It is preferred to separate the pyrolysed black liquor gas and the solid mass using centrifugal force and inertia. This technique is based on the recovery of solid particles by a change of direction of the solids-containing gas flow. This is commonly obtained by using one or more cyclones or deflection devices. Separation with one or more cyclones or deflection devices may be followed by electrostatic separation or other fine particle removal techniques, if found desirable.

The pyrolysed black liquor gas can be processed further in a second reactor. Preferably, the black liquor gas is treated catalytically in a fixed bed or in a fluidized bed. In the second reactor the pyrolysed black liquor gases can be upgraded and can be converted to, for example, monomeric aromatics. During this process, some cokes or carbon can be produced, which can obstruct the pores of the catalyst. The catalyst can be regenerated intermittently or continuously and the generated heat can be used elsewhere in the plant where energy is required. During the regeneration the cokes or carbon can be converted to carbon monoxide. This carbon monoxide can be used elsewhere in the plant. Preferably, the carbon monoxide is used as fuel in the recovery boiler for melting the salt in the solid mass. The catalytic reaction occurs preferably at a temperature between 300° C. and 700° C., more preferably between 400° C. and 600° C.

The pyrolysed black liquor gas or the treated pyrolysed black liquor gas are condensed. Preferably the gasses are cooled down to a temperature of between 80 and 110° C., preferably about 90° C. As described, heat and residual gas released during this cooling process, can be recovered for further use in the pulp and paper plant. Preferably, the energy is used to heat the solids heater or for the pyrolysis reaction. During the cooling step some compounds in the vapors are condensed and the formed liquid is separated from the gas. The liquid fraction can be further fractionated and desirable compounds, such as monomeric aromatics like benzene, toluene and xylene, are recovered. During condensing, the $CO_2$ remains in the gas phase and separates off the desirable compounds.

The above and other characteristics, features and advantages of the present invention will become apparent when taken in conjunction with the accompanying drawing, which illustrates, by way of example, the principles of the invention. This description is given for the sake of example only, without limiting the scope of the invention. The reference FIGURE quoted below refers to the attached drawing.

FIG. 1 illustrates a process for treating black liquor according to the invention. Black liquor 10, preferably strong black liquor, enters a fluidized bed reactor 100 comprising a solid mass at a temperature of between 450° C. and 900° C., which solid mass fluidizes in the reactor and subjects the black liquor to a pyrolysis reaction providing solid particles, forming part of the solid mass, and pyrolysed black liquor gas. The solid mass and pyrolysed black liquor gas 11 stream to a separator such as cyclone 200 where the solid mass in the stream is substantially separated from the gas. The pyrolysed black liquor gas 23 flows to a second reactor 500 for further treatment. The second reactor 500 can have a fluidized bed catalyst or a fixed bed catalyst. The catalyst may need to be regenerated intermittently, and the pyrolysed black liquor may flow to another reactor 600 comprising such catalyst so that the whole process can continue. In the meantime the catalyst in reactor 500 will be regenerated. Once that has occurred, the pyrolysed black liquor gas can flow again in reactor 500, and at the same time the catalyst can be regenerated in the regeneration reactor 600. The treated pyrolysed black liquor gas 51 or 61 streams to a condenser 800. The gas stream cools down. The liquid that is formed 82 may now comprise desirable compounds such as olefins, naphthalene, benzene, toluene, xylene. Not all the treated pyrolysed black liquor gas is condensed. The gas residue that remains after the condensation and the heat released during the condensation 83 and 84 can be used as energy source in other places of the process. During regeneration of the catalyst, the cokes on the catalyst can be converted to carbon monoxide 62.

At least a part of the solid mass 21 that is separated in the separator 200 streams to a solids heater 300, so that it can warm up to the desired temperature so that the solid mass can be used again in the fluidized bed reactor. The heated solid mass 31 streams then to the fluidized bed reactor 100 and subjects black liquor to a pyrolysis reaction. The solids heater uses energy that is released from other parts in the process, to heat the solid mass to the predetermined temperature. The heat and the residual gas released during the condensation can (partially) stream 83 to the solids heater to warm the solid mass. Also extra energy may be required. This can come from a heater 700 which heats e.g. air 71, which can then be used to heat the solid mass in the solids heater 72. Heat and residual gasses that are released during the heating of the solid mass 33 can be recovered to heat a recovery boiler 400. At least part of the heat and residual gas released during the condensation 84, can also be used to heat the recovery boiler 400. A part of the solid mass 22 that is separated from the pyrolysed black liquor gas can be brought to the recovery boiler 400, so that enough salt 41 can be recovered to be used in the paper mill. The carbon monoxide 62 that is an exit stream from the catalyst regenerator can be fed to the recovery boiler, where it can be used as fuel for melting the salts in the recovery boiler.

The invention claimed is:

1. Process for treating black liquor comprising the steps of:
   a) providing a fluidized bed reactor comprising a solid mass that comprises solid particles, wherein the solid mass has a temperature and heat capacity such that black liquor pyrolyses and such that the solid particles remain fluidizable;
   b) flowing black liquor into the fluidized bed reactor to provide a pyrolysis reaction of the black liquor and to obtain solid particles and pyrolysed black liquor gas, wherein the solid particles form part of the solid mass;
   c) separating the solid mass from the pyrolysed black liquor gas;
   d) heating at least a first part of the solid mass;
   e) returning the heated solid mass to the fluidized bed reactor for use in the pyrolysis reaction;
   f) treating the pyrolysed black liquor gas in a second reactor to obtain treated pyrolysed black liquor gas;
   g) condensing the treated pyrolysed black liquor gas, to obtain a condensate, heat released during condensation and a residual gas; and
   h) recovering the heat and/or the residual gas released during condensation.

2. The process according to claim 1, wherein the heating of the at least first part of the solid mass occurs in a solids heater providing a heated solid mass and a solids heater residue, and wherein the solid mass is heated to a predetermined temperature.

3. The process according to claim 2, wherein the predetermined temperature is between 400° C. and 900° C.

4. The process according to claim 1, wherein the solids heater residue is used for heating a recovery boiler.

5. The process according to claim 1, wherein treating the pyrolysed black liquor gas in the second reactor is a catalytic treating of the pyrolysed black liquor gas using a catalyst.

6. The process according to claim 5, wherein the catalyst is regenerated in a catalyst regenerator to yield regenerated catalyst and carbon monoxide.

7. The process according to claim 6, wherein the carbon monoxide is fed to a recovery boiler.

8. The process according to claim 1, wherein a non-reactive fluidizing gas is added to the fluidized bed reactor to create a superficial velocity of 0.5 m/s to 10 m/s.

9. The process according to claim 1, wherein at least a second part of the solid mass is treated in a recovery boiler to obtain recovered salt.

10. The process according to claim 1, wherein the pyrolysis reaction occurs without a catalyst.

11. The process according to claim 1, wherein the black liquor has a temperature of between 100° C. and 150° C.

12. The process according to claim 1, wherein the black liquor is in the form of droplets in the size range 0.01 mm to 3 mm.

13. The process according to claim 1, wherein the black liquor has a solid mass concentration of greater than 70%.

14. The process according to claim 1, wherein the fluidized bed has a temperature of between 400° C. and 900° C., and/or wherein the pyrolysis occurs at a pressure of between 0.5 bara and 5 bara.

15. The process according to claim 1, wherein the solid mass and the pyrolysed black liquor gas is separated in a cyclone.

16. The process according to claim 1, wherein the solids heater heats the solid mass by an external heater.

17. The process according to claim 1, wherein the recovered heat and/or the residual gas released during condensation is used for heating the at least first part of the solid mass, and/or for use in a recovery boiler.

18. The process according to claim 1, wherein the treated pyrolysed liquor gas obtained in step f) is absorbed using an absorption material.

\* \* \* \* \*